United States Patent
Louie

(10) Patent No.: US 7,081,233 B2
(45) Date of Patent: Jul. 25, 2006

(54) METHOD AND APPARATUS FOR DEGASSING LIQUID SULFUR

(75) Inventor: James G. (Jim) Louie, Calgary (CA)

(73) Assignee: Dynamax Engineering Ltd., Calgary (CA)

( * ) Notice: Subject to any disclaimer, the term of this patent is extended or adjusted under 35 U.S.C. 154(b) by 113 days.

(21) Appl. No.: 10/847,580

(22) Filed: May 18, 2004

(65) Prior Publication Data

US 2005/0260121 A1 Nov. 24, 2005

(51) Int. Cl.
| | |
|---|---|
| *B01F 13/00* | (2006.01) |
| *B01J 19/00* | (2006.01) |
| *C01B 17/00* | (2006.01) |
| *C01B 17/027* | (2006.01) |

(52) U.S. Cl. .............. 423/578.1; 423/564; 423/576.8; 422/129; 422/211; 422/219; 422/224; 422/229; 422/234

(58) Field of Classification Search .............. 423/129, 423/576.8, 578.1, 564; 422/129, 211, 219, 422/224, 229, 234, 255, 305

See application file for complete search history.

(56) References Cited

U.S. PATENT DOCUMENTS

| | | | |
|---|---|---|---|
| 4,280,990 A | | 7/1981 | Jagodzinski |
| 4,419,337 A | | 12/1983 | Jagodzinski |
| 4,423,025 A | * | 12/1983 | Ledford et al. ........... 423/578.1 |
| 4,537,605 A | | 8/1985 | Gouw |
| RE32,009 E | * | 10/1985 | Ledford et al. ......... 423/578 R |
| 4,612,020 A | * | 9/1986 | Fischer et al. ................ 95/243 |
| 4,729,887 A | | 3/1988 | Pendergraft |
| 4,755,372 A | | 7/1988 | Baker |
| 4,844,720 A | | 7/1989 | Pendergraft |
| 4,849,204 A | | 7/1989 | Voirin |
| 4,857,297 A | | 8/1989 | Kettner |
| 4,897,251 A | | 1/1990 | Maurice |
| 5,004,591 A | | 4/1991 | Maurice |
| 5,030,438 A | | 7/1991 | Voirin |
| 5,632,967 A | | 5/1997 | Nasato |
| 5,935,548 A | | 8/1999 | Franklin |
| 6,010,677 A | | 1/2000 | Scheybeler |
| 6,149,887 A | | 11/2000 | Lagas |
| 6,334,991 B1 | * | 1/2002 | Strickland et al. ....... 423/578.1 |
| 6,428,200 B1 | | 8/2002 | Fleischli |
| 6,676,918 B1 | | 1/2004 | Wu |

OTHER PUBLICATIONS

Hyne, J.B., and Wassnik, B., "Degassing Liquid Sulfur", ASRL Quarterly Bulletin, XXVII (4), p. 14-42, Jan.-Mar. 1991.

Clark, P.D., McDonald, T.L., and Lesage, K.L., "Studies on the Release of $H_2S$ from Liquid Sulfur", 1992 GRI Liquid Redox Sulfur Recovery Conference, Austin, Texas, Oct. 4-6, 1992.

(Continued)

Primary Examiner—Stanley S. Silverman
Assistant Examiner—Timothy C. Vanoy
(74) Attorney, Agent, or Firm—Sean W Goodwin

(57) ABSTRACT

A vessel is mounted external to a liquid sulfur storage pit for degassing liquid sulfur at atmospheric pressure. Liquid sulfur is re-circulated from the pit to a static mixing device extending from a head space to the liquid sulfur which provides intimate contact of the liquid sulfur as it flows downwardly and sweep air flowing through the head space above the pit. Further, the static mixing device prevents free fall of liquid sulfur and the hazards of static electricity associated therewith. Use of a heat traced gas outlet induces flow of sweep gas from the system, obviating the need for a steam eductor or blower.

25 Claims, 3 Drawing Sheets

OTHER PUBLICATIONS

Clark, P.D., Lesage, K.L., McDonald, T., and Neufeld, A.K., "Investigations into the Chemical Mechanisms of Liquid Sulfur Degassing and their Relevance to Industrial Degassing Systems", ASRL Quarterly Bulletin XXXI (1), p. 23-64, Apr.-Jun. 1994.

Clark, P.D., Lesage, K.L., Fitzpatrick, E., and Davis, P.M., "$H_2S$ Solubility in Liquid Sulfur as a Function of Temperature and $H_2S$ Gas Phase Partial Pressure", ASRL Quarterly Bulletin XXIV (1), p. 19, Oct.-Dec. 1997.

Nasato, E. and Allison, T.A., "Sulfur Degasification—The D'Gaass Process", prepared for presentation at the Laurance Reid Gas Conditioning Conference, Mar. 1-4, 1998.

Johnson, J.E. and Hatcher, N.A., "Hazards of Molten Sulfur Storage & Handling", presented at the 53rd Annual Laurance Reid Gas Conditioning Conference, Feb. 23-26, 2003.

Johnson, J.E. and Hatcher, N.A., "A Comparison of Established Sulfur Degassing Technologies", presented at the 53rd Annual Laurance Reid Gas Conditioning Conference, Feb. 23-26, 2003.

* cited by examiner

METHOD AND APPARATUS FOR DEGASSING LIQUID SULFUR

FIELD OF THE INVENTION

This embodiment of the invention relates method and apparatus for removing hydrogen sulfide gases from liquid sulfur, and more particularly to methods for renewing liquid surfaces for evolving of gasses dissolved therein.

BACKGROUND OF THE INVENTION

An important process for removing hazardous hydrogen sulfide ($H_2S$) from various waste gases, including gases produced during the refining of petroleum products, is known as the Claus process. It involves the following net reaction:

$$H_2S + \tfrac{1}{2}O_2 \rightarrow H_2O + S \qquad (1)$$

Sulfur produced by the Claus process contains high levels of $H_2S$ (typically, 250 to 300 ppmw) which exists as both dissolved $H_2S$ and as $H_2S_x$ hydrogen polysulfides bound in liquid sulfur. The dissolved $H_2S$ separates from the sulfur readily; however, the $H_2S$ bound in the hydrogen polysulfides must be first decompose back into $H_2S$ and elemental sulfur.

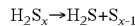

$$H_2S_x \rightarrow H_2S + S_{x-1}$$

This reaction is slow and accounts for the difficulty in degassing sulfur. The residence of time of liquid sulfur in conventional degassing processes can be several days.

The motivation to degas sulfur arrives from the toxicity, explosiveness, and corrosive nature of $H_2S$. $H_2S$ is lethal at 600 ppmv, and is explosive at roughly 3.5% volume in air. Both of these conditions are of concern, especially during loading and unloading operations. The head space in a tank or tank truck can easily exceed the toxicity and explosive limit if the sulfur is not degassed.

Conventionally degassing takes place after the Claus process. Sulfur from the Claus process flows into a pit. Over time, as the sulfur cools somewhat and is agitated, $H_2S_x$ compounds decompose and form dissolved $H_2S$ and elemental sulfur. Desorbed $H_2S$ collects in the head or vapor space in the pit or vessel above the sulfur.

Despite the fact that both $H_2S$ and sulfur are flammable in air, the conventional industry practice is to use an air sweep of the sulfur pit vapor space to maintain the $H_2S$ level to well below the Lower Explosive Limit (LEL) of $H_2S$. The Lower Explosive Limit for $H_2S$ is 3.85% at a storage temperature of 330° F. It is common industry practice to have sufficient sweep air to maintain a $H_2S$ concentration of less than 1% in the vapor space above the sulfur pit and thereby achieve a margin of safety.

Sweep air is typically drawn from the head space by a blower or a steam eductor. Such equipment is subject to fouling by crystalline sulfur.

Further, it is a disadvantage of modern, commercial degasification processes that they require large, complex and accordingly, expensive equipment. For example, in one process, known as the Shell process, degassing takes place in a storage tank or sulfur pit equipped with stripping columns, where liquid sulfur is vigorously agitated by bubbling air there through at atmospheric pressure. The stripping columns are open at the tops and bottoms to allow the sulfur to circulate at a rate of few hundred times per hour. The bubbling air, together with an additional flow of air, is then used as a low pressure sweep gas to displace the gases produced by the degasification process. The low pressure gases so produced are then fed to an incinerator where the $H_2S$ is oxidized to $SO_2$ and released to the atmosphere. Depending on the design, a liquid or gaseous catalyst, such as ammonia, ammonium thiosulfate, urea, morpholine, or an alkanol amine may be added for accelerating the decomposition of the polysulfide to $H_2S$ and elemental sulfur.

In an alternative process, known as the D'GAASS process, degassing takes place in a vessel under pressure of at least 40 psig to 75 psig. Compressed air and high pressure sulfur are pumped to this pressure vessel. The pressure vessel contains a static mixing device which provides intimate contact between the two streams. The thus degassed liquid sulfur is discharged from the vessel and the air containing the $H_2S$ is discharged to an incinerator.

In another alternative process, known as the SNEA process, degassing takes place by repeated circulation and spraying the liquid sulfur into the sulfur pit. Release of dissolved $H_2S$ is achieved by spraying liquid sulfur through jets at a specific velocity. Ammonia, injected at the suction of the recirculation pump, is typically used as a catalyst. After the $H_2S$ gas is released, it is removed by a sweep gas and fed to an incinerator.

Both the stripping columns used by the Shell process and the circulation/spraying equipment used in the SNEA process are costly and require a large amount of space. The D'GAASS process ignores the requirement to have sweep air in the sulfur pit vapor space or safe operation of the sulfur pit.

Accordingly, there has existed a definite need for a degasification process that, not only effectively reduces the $H_2S$ content of liquid sulfur but, is simple, requires a minimum of space and is inexpensive and results in safe conditions.

SUMMARY OF THE INVENTION

Now of the invention, there has been found a simple, effective and relatively inexpensive process employing apparatus for degassing liquid sulfur at low pressures including atmospheric pressure. Liquid sulfur is intimately mixed with oxidizing gas for maximal evolution of dissolved hydrogen sulfide without associated risks of the prior art. As earlier described, due to excellent insulating properties of molten sulfur, static electricity discharge can build up where free fall of sulfur is allowed. Several incidents have been reported where static electricity buildup was believed to have initiated a sulfur fire or explosion.

Accordingly, in one embodiment, degassing of liquid sulfur is achieved through agitation of the sulfur as it falls along a static mixing device such as one or more link-chains. Further, the static mixing device is preferably electrically grounded in which free fall is minimized, avoided or otherwise neutralized.

An upper end of one or more chains is suspended in the head space above the sulfur and extend to below the surface of the liquid sulfur residing in a pit or sump. A stream of liquid sulfur containing hydrogen polysulfides and $H_2S$ is introduced onto the upper end of the chains for flow downwards on the chains clinging thereto. As the liquid sulfur flows over the chain, the liquid is agitated and the vapor-liquid degassing surface is continually renewed for evolution of dissolved $H_2S$. The liquid sulfur flows from the chain onto the vapor-liquid interface of the liquid sulfur in the pit. The circulated sulfur remains on the surface where there is continued contact with the sweep air to complete the dissolution of the $H_2S$. The liquid sulfur is continuously re-circulated from the pit to the chain by a pump. Sweep air is introduced over the pit and along the sulfur flowing over the chains so that evolved $H_2S$ is collected.

In another embodiment, heat tracing of the sweep air outlet, such as through steam tracing, heats the sweep gas and induces flow of sweep gas from the head space by convection, thereby obviating the need for an eductor and avoiding blockages and complications due to crystalline sulfur deposition.

In some embodiments for even greater removal of $H_2S$, the recirculation of liquid sulfur to the chain flows through a section of pipe that contains a solid catalyst for promoting the oxidation of the hydrogen polysulfides to $H_2S$ and elemental sulfur. Also in some embodiments, a liquid or gaseous catalyst for promoting the decomposition of hydrogen polysulfides into $H_2S$ is introduced at the suction of the re-circulating pump.

DETAILED DESCRIPTION OF THE PREFERRED EMBODIMENTS

Figure 1:
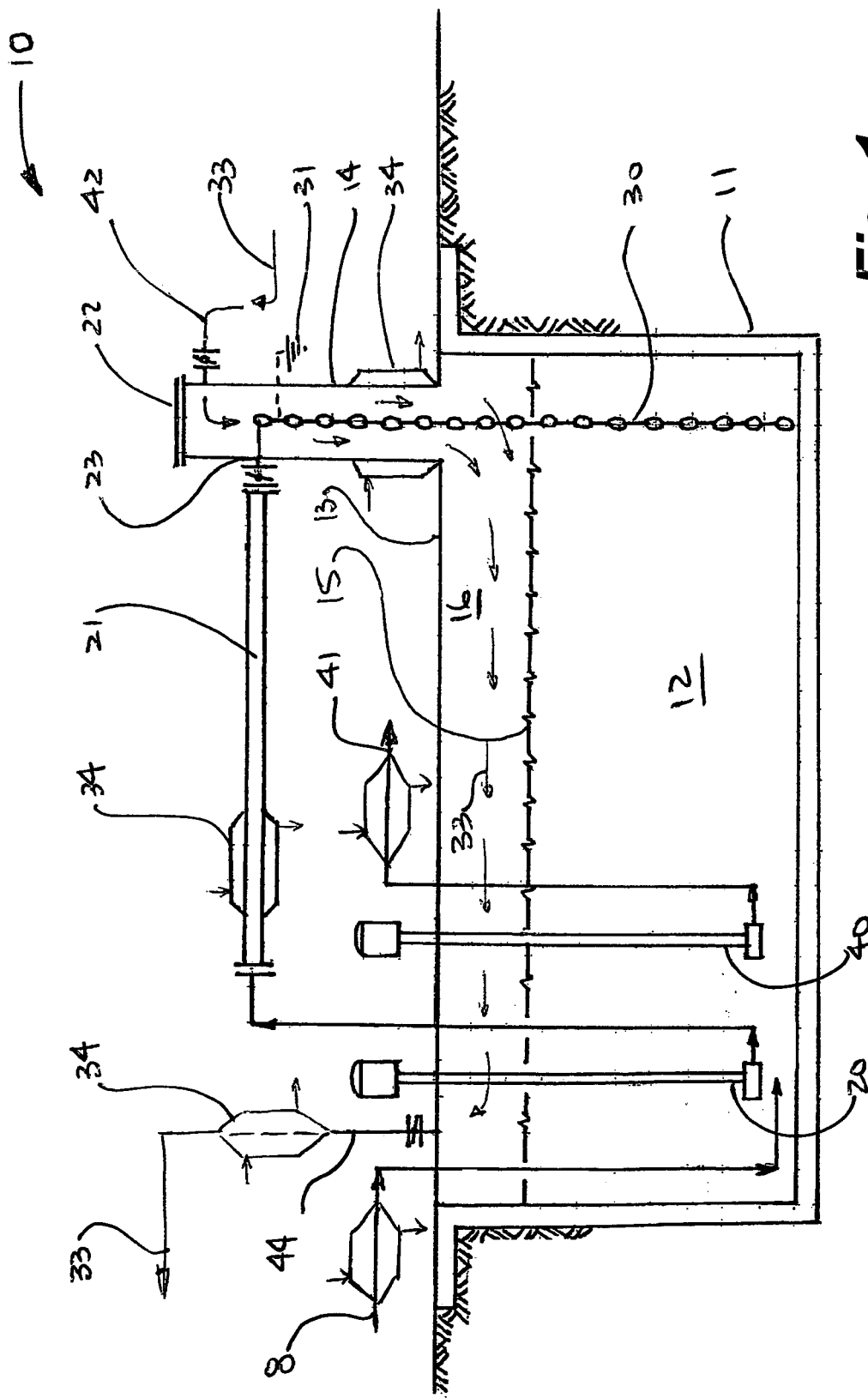
FIG. 1 is a schematic representation of a degassing system implementing one embodiment of the invention and demonstrating co-current sulfur and sweep gas flow.

With reference to FIG. 1, a degassing apparatus 10 of one embodiment of the invention comprises a main vessel or pit having a sump or pit 11 for receiving liquid sulfur 12. The materials of construction for the pit 11 and related equipment are chosen to be essentially inert to oxidizing gases, liquid sulfur, and the like and typically comprise carbon steel. The pit 11 has a roof closure 13 and a vertically-oriented degassing vessel 14. The pit 11 has a liquid sulfur inlet 8.

An influent stream of liquid sulfur 12 rich in hydrogen polysulfides and $H_2S$, such as that produced by a Claus processing unit, flows through inlet 8 and into the pit 11. The liquid sulfur accumulates in the pit 11 and forms a liquid surface 15. A vapor head space 16 is formed above the liquid surface 15 which is in communication with the degassing vessel 14.

Rich liquid sulfur 12 is re-circulated by a loading or transfer pump 20 through piping 21 and is introduced into an upper portion 22 of the degassing vessel 14 through a liquid sulfur inlet 23 for return to the pit 11.

The sulfur transfer pump 20 can include those typically used in conventional Claus plants for delivering liquid sulfur from sulfur recovery units to a liquid storage container or to a sulfur loading station for transport. Consequently, conventional sulfur transfer or loading pumps 20 are readily adaptable for use in this embodiment.

Degassed or lean liquid sulfur 12 is removed from the pit 11 by transfer pump 40 and through discharge piping 41. Discharge pump 40 is typically similar to re-circulation pump 20 and is positioned for receiving and discharging degassed liquid sulfur as a product.

The degassing vessel 14 is fit with one or more static mixing devices 30. The number of devices 30 is related to the re-circulation rate of sulfur 12, the higher the flow rate, the larger the device or the greater the number of devices 30. Liquid sulfur 12 from the liquid sulfur inlet 23 is directed onto the one or more static mixing devices 30.

Figure 2:
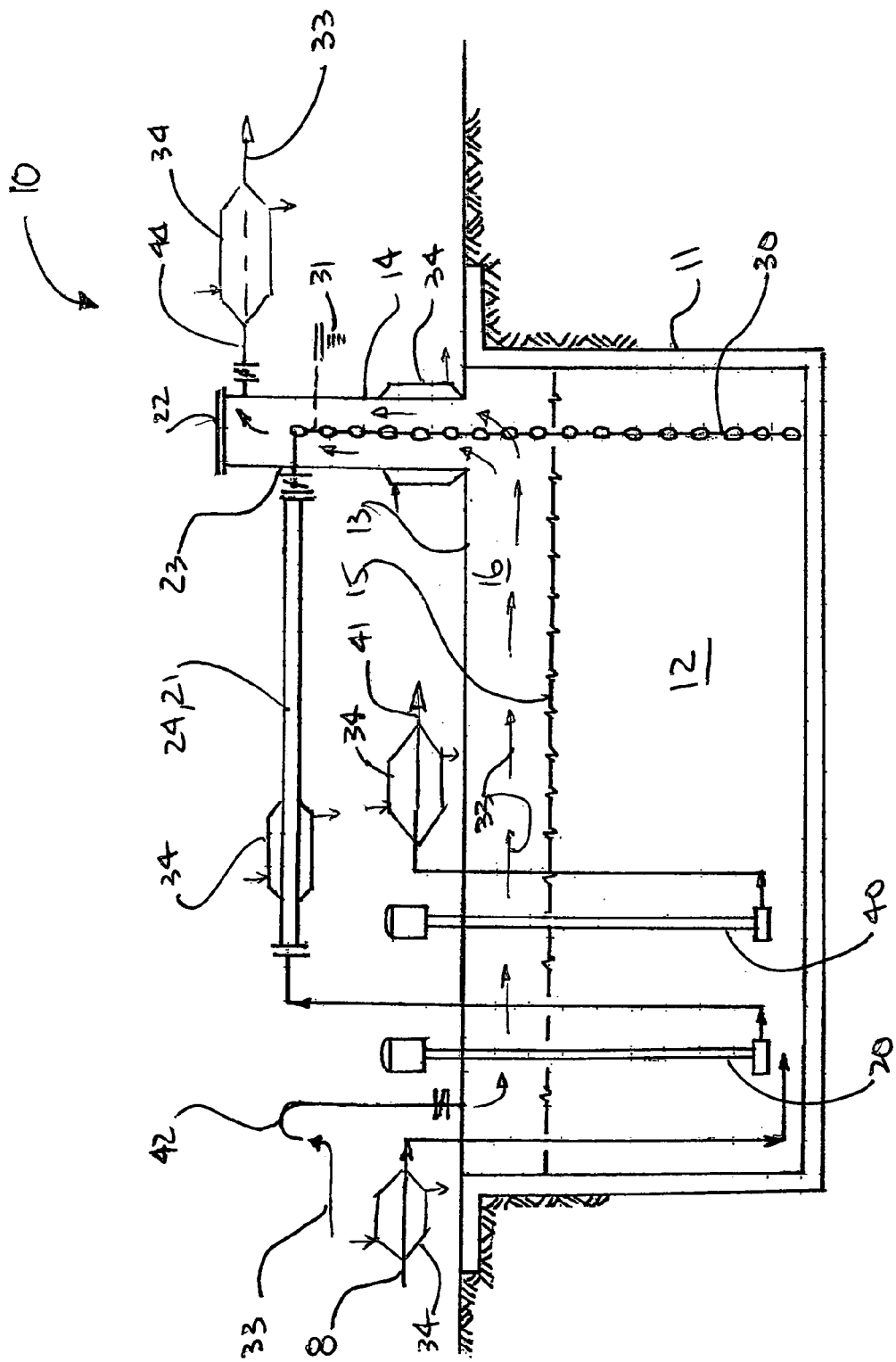
FIG. 2 is a schematic representation of a degassing system implementing another embodiment of the invention for demonstrating counter-current sulfur and sweep gas flow.

In one embodiment shown in FIGS. 1 and 2, and for simplicity, one device 30 is shown in the cross-section illustrations although device 30 can represent one or more link-chains. The static mixing device 30 promotes agitation of the stream of liquid sulfur 12 as it flows downwards; the sulfur clings onto the device 30 by the surface tension of the liquid sulfur. Other embodiments of the static mixing device 30 include rope or metal rope, pipe, or a conventional fluid mixing device such as a helical device.

The static mixing device 30 minimizes free fall of the liquid sulfur 12. Free fall of liquid sulfur has been shown to create static electricity which can cause ignition of the $H_2S$, sulfur vapors or other combustible gases found in the head space 16 above the liquid sulfur in the pit 12. The static mixing device is electrically grounded 31 to earth so prevent the build-up of static electricity.

Figure 3:
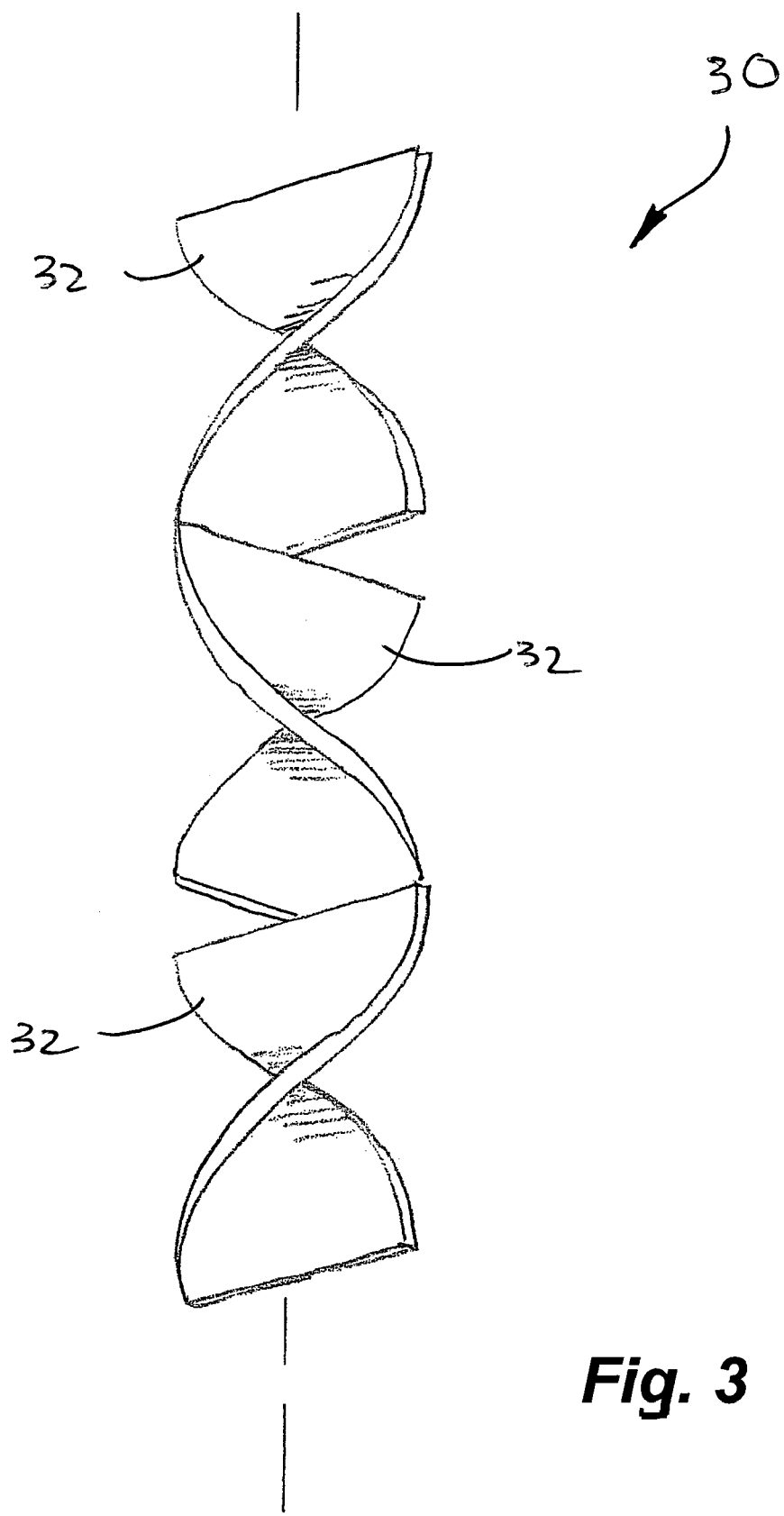
FIG. 3 is a perspective drawing showing one alternate helical embodiment of a static mixing device for use in some embodiments of the process of the invention.

With reference to FIG. 3, a helical static mixing device 30 consists of a series of stationary, rigid elements 32 placed to similar effect as the link-chain embodiment. The helical elements form intersecting channels that split, rearrange, and recombine the component streams. Similar static mixing devices are manufactured by Koch Engineering Co., Wichita, Kans. and Chemineer Kenics, North Andover, Mass. (www.kenics.com).

As the liquid sulfur 12 containing hydrogen polysulfides and $H_2S$ flows over the mixing device 30 the liquid is agitated and a vapor-liquid degassing surface is continually renewed for evolution of dissolved $H_2S$ therefrom.

The static mixing device 30 not only efficiently agitates the liquid sulfur, but also because it has no moving parts, it adds to the simplicity and low cost of the process.

The devices 30 extend substantially continuously between the liquid sulfur inlet 23 and vapor-liquid interface or surface 15 of the liquid sulfur in the pit 11. The sulfur inlet can include a reservoir having one or more discharges through which the one or more static mixing devices nozzle extend for directing the liquid sulfur onto each of the one or more devices before they extend out of the reservoir and downwardly to the pit 11. The liquid sulfur flows along and from the static mixer 30 onto the liquid sulfur surface 15.

Sweep air 33 is introduced into the apparatus through gas inlet 42 to traverse the degassing vessel and the head space 16 for extraction through outlet 44 so that evolved $H_2S$ in the head space 16 is removed from the pit 11.

The liquid sulfur 12 traverses the pit 11, much of which remains adjacent surface 15 where there is continued contact with the sweep air 33 to complete the dissolution of the $H_2S$. Rich liquid sulfur is continuously re-circulated from the pit 11 to the mixing device 30 by pump 20.

Returning to FIG. 1, one embodiment of a method of operation is shown. A stream of sweep air 33, such as an oxidizing gas or air, is introduced at the inlet 42 located near the top of the degassing vessel 14. The sweep air 33 is drawn downward in the degassing vessel 14 and into the vapor space 16 above the sulfur pit. In a co-current flow, the sweep air and liquid sulfur both progress down the degassing vessel 14.

The sweep air collects $H_2S$ through the head space 16 and is expelled through a discharge 44 at the opposite end of the pit 11. The sweep air 33 is expelled by the vacuum action provided by a vacuum pump such as an eductor or more preferably is induced by convective chimney effect through a heat tracing 34 of the discharge 44 such as through heat-jacketing of related piping.

Conventional processing would have the sweep air 33 containing $H_2S$ disposed in an incinerator or recycled to the suction of combustion air blowers of the sulfur recovery plant. The rate of sweep air 33 through the head space 16 removes evolved $H_2S$ gas so that the concentration of the $H_2S$ gas is below the lower explosive limit (LEL) of the $H_2S$ in air and more preferably to about ¼ of the LEL to provide a safety factor of 4:1. The residence time of liquid sulfur in the degassing vessel 14 is typically less than about one minute and more preferably from about one second to about 30 seconds.

Any suitable oxidizing gas can be employed as sweep gas 33. Representative oxidizing gases include air, oxygen-enriched air, mixtures of gases containing oxygen, sulfur dioxide and sulfur dioxide-enriched gases. Air or oxygen-enriched air is preferred.

The pit 11, re-circulation piping 21, sweep air inlet and discharges 42,44 and the liquid sulfur influent 8 and effluent 41 are typically steam jacketed 34 which provides for the flow of steam or other suitable heating media therebetween. This enables the various streams to be heated to a temperature above the melting temperature of solid sulfur to a temperature of from about 265° F. to about 285° F. Preferably, the temperatures are maintained at about 270° F. for optimal release of $H_2S$. The degassing vessel 14 is also surrounded by a carbon steel jacket for a heating media such as steam to circulate between the vessel and the jacket and avoid formation of solid sulfur onto the vessel's inner surfaces.

As seen in FIG. 1, the liquid sulfur stream and the oxidizing gas streams pass co-currently through the degassing vessel 14.

In an alternative embodiment, the streams of liquid sulfur 12 and sweep gas 33 pass counter-currently as shown in FIG. 2, or in any arrangement therebetween including cross flow (not shown).

With reference to a counter-current embodiment of FIG. 2, the liquid sulfur stream is continuously circulated by pump 20 and down the degassing vessel 14. Sweep air is introduced from inlet 42 and flows through the head space 16 to rise up the degassing vessel 14 against the downward flow direction of the liquid sulfur. Again, the sweep gas 33 is continuously circulated to remove $H_2S$ and other combustible gases from the head space 16 and the degassing vessel 14, shown as being induced by heat tracing 34 of the discharge 44.

As shown as an option in FIG. 2, to further enhance the degassing reaction, the liquid sulfur and oxidizing gas streams are contacted in a catalyst section 24 containing a solid catalyst bed for promoting the oxidation of hydrogen polysulfides to $H_2S$ and elemental sulfur. Preferred catalysts include Claus catalysts, including activated alumina. Claus catalysts are well known in the art. They are typically made of activated alumina in a suitable shape, such as spheres or pellets. Other suitable catalysts include Claus-like catalysts, such as titanium dioxide, Selectox™ (manufactured by Davisson Chemical Co.) and the like. The catalyst section 24 can comprises a pipe spool between pump 20 and the Inlet 23 to the degassing vessel 14. The catalyst bed is kept in place in the catalyst section 24 with screens mounted between flanges located at both ends of the pipe spool. In an alternative embodiment (not shown), the catalyst bed is located inside the degassing vessel 14, below the sulfur inlet connection 23.

In some embodiments, a liquid or gaseous fluid catalyst for promoting the decomposition of hydrogen polysulfides to $H_2S$ is added to either or both streams. In the embodiment shown in FIG. 1 and FIG. 2, the fluid catalyst is introduced through piping 21 before the liquid sulfur stream is introduced into the degassing vessel 14. Representative fluid catalysts include ammonia, ammonium thiosulfate, morpholine, urea, alkanol amines, such as diisopropanol amine, and mixtures thereof.

It is another major advantage of the method of the invention that it results in the removal of substantially all of the total $H_2S$ from the initial liquid sulfur stream, where "total $H_2S$" means the total of both hydrogen polysulfides and $H_2S$ by weight. Using the inventive process, the total $H_2S$ can be reduced to less than about 30 ppmw.

One understands that total $H_2S$ can be further reduced through adjusting operational parameters including increased re-circulation, increased effective length of static mixing and increase residence times. Total $H_2S$ can be reduced to less than about 10 ppmw. One may opt to employ one of the above catalyst embodiments in addition to adjusting other operational parameters.

Furthermore, the degassing vessel 14 operates at atmospheric pressure and is considerably smaller, simpler, and less expensive than the pressurized vessel used in the D'GAASS process, than the stripping columns used in the Shell process, and the circulation/spraying equipment used in the SNEA process.

While the invention has been described in detail with reference to certain preferred embodiments thereof, it will be understood that modifications and variations are within the spirit and scope of that which is described and claimed.

The embodiments of the invention for which an exclusive property or privilege is claimed are defined as follows:

1. A process for degassing a stream of liquid sulfur containing at least hydrogen sulfide comprising:
   providing a degassing vessel having a vapor space and one or more static mixing devices extending downwardly through the vapor space of the degassing vessel;
   flowing a stream of an oxidizing gas through the vapor space of the degassing vessel;
   directing the liquid sulfur onto the one or more static mixing devices for flowing the liquid sulfur down the one or more static mixing devices for forming a degassing surface and intimately exposing the degassing surface to the oxidizing gas while avoiding freefall of the liquid sulfur in the vapor space; and
   producing a stream of degassed liquid sulfur and a stream of product gas containing hydrogen sulfide.

2. The process of claim 1 wherein the one or more static mixing devices extend to a liquid sulfur sump, the process further comprising:
   flowing the liquid sulfur down the one or more static mixing devices to the sump; and
   re-circulating liquid sulfur from the sump to the one or more static mixing devices.

3. The process of claim 2 wherein the sump has a head space communicating with the vapor space of the degassing vessel, the process further comprising:
   flowing the stream of oxidizing gas through both the head space and through the vapor space of the degassing vessel.

4. The process of claim 1 wherein the oxidizing gas flows counter-current to the liquid sulfur flowing down the one or more static mixing devices.

5. The process of claim 1 wherein the oxidizing gas flows co-current to the liquid sulfur flowing down the one or more static mixing devices.

6. The process of claim 1 wherein the oxidizing gas is flowing at a rate sufficient to maintain the concentration of hydrogen sulfide in the product gas below the lower explosive limit.

7. The process of claim 1 wherein the oxidizing gas is air or oxygen-enriched air.

8. The process of claim 1
wherein the liquid sulfur contains hydrogen polysulfides and hydrogen sulfide and prior to flowing the liquid sulfur down the one or more static mixing devices, further comprising:
flowing the liquid sulfur across a catalyst bed for promoting the decomposition of the hydrogen polysulfides to hydrogen sulfide and elemental sulfur.

9. The process of claim 1 further comprising maintaining the temperature of the liquid sulfur from about 265° F. to about 285° F.

10. The process of claim 9 wherein the temperature is about 270° F.

11. The process of claim 1 wherein the stream of oxidizing gas is flowed through The degassing vessel until the stream of degassed liquid sulfur has a total hydrogen sulfide content of less than about 30 ppmw.

12. The process of claim 11 wherein the stream of oxidizing gas is flowed through the degassing vessel until the stream of degassed liquid sulfur has a total hydrogen sulfide content of less than about 10 ppmw.

13. The process of claim 1 further comprising introducing a fluid catalyst along with at least one of the streams of oxidizing gas or liquid sulfur for promoting the decomposition of hydrogen polysulfides to hydrogen sulfide and elemental sulfur.

14. The process of claim 13 wherein the fluid catalyst is selected from the group consisting of ammonia, ammonium thiosulfate, urea, morpholine, an alkanol amine and mixtures thereof.

15. The process of claim 1 wherein the degassing vessel is provided at substantially atmospheric pressure.

16. Apparatus for degassing a stream of liquid sulfur containing at least hydrogen sulfide comprising:
a degassing vessel having a vapor space;
one or more static mixing devices extending downwardly through the vapor space of the degassing vessel;
a liquid sulfur inlet at an upper end of the degassing vessel for directing liquid sulfur onto the one or more static mixing devices for flowing liquid sulfur down the one or more static mixing devices while avoiding freefall of the liquid sulfur in the vapor space; and
a gas inlet and a gas outlet through which a stream of an oxidizing gas flows through the vapor space of degassing vessel,
wherein the liquid sulfur flows down the one or more static mixing devices for forming a degassing surface which is intimately exposed to the oxidizing gas for producing a stream of degassed liquid sulfur and a stream of product gas containing hydrogen sulfide.

17. The apparatus of claim 16 wherein the one or more static mixing devices are link-chains.

18. The apparatus of claim 16 wherein the one or more static mixing devices are helical static mixers.

19. The apparatus of claim 16 further comprising heat tracing about the gas outlet for convectively inducing flow of the oxidizing gas from the degassing vessel.

20. The apparatus of claim 16 wherein the gas outlet is located adjacent the upper end of the degassing vessel wherein the oxidizing gas flows counter-current to the liquid sulfur flowing down the one or more static mixing devices.

21. The apparatus of claim 16 further comprising a catalyst section located at the liquid sulfur inlet so that the liquid sulfur flows through the catalyst section before flowing down the one or more static mixing devices.

22. The apparatus of claim 16 further comprising a liquid sulfur sump below the degassing vessel and wherein the one or more static mixing devices extend through the vapor space to the liquid sulfur sump.

23. The apparatus of claim 22 further comprising a re-circulation pump for circulating liquid sulfur from the sump to the one or more static mixing devices.

24. The apparatus of claim 22 wherein the sump is in a pit.

25. The apparatus of claim 22 wherein the gas outlet is located adjacent the sump wherein the oxidizing gas flows counter-current to the liquid sulfur flowing down the one or more static mixing devices.

* * * * *